US008825970B1

(12) United States Patent
Grunwald et al.

(10) Patent No.: US 8,825,970 B1
(45) Date of Patent: Sep. 2, 2014

(54) SYSTEM AND METHOD FOR MOUNTING A STORAGE VOLUME UTILIZING A BLOCK REFERENCE LIST

(75) Inventors: David Grunwald, Santa Clara, CA (US); Stanley Luke, Stowe, MA (US); Randall Smith, Arlington, MA (US); Vaibhav Nivargi, Stanford, CA (US)

(73) Assignee: NetApp, Inc., Sunnyvale, CA (US)

( * ) Notice: Subject to any disclaimer, the term of this patent is extended or adjusted under 35 U.S.C. 154(b) by 1878 days.

(21) Appl. No.: 11/740,870

(22) Filed: Apr. 26, 2007

(51) Int. Cl.
*G06F 13/00* (2006.01)
*G06F 17/30* (2006.01)

(52) U.S. Cl.
CPC .................................... *G06F 13/00* (2013.01); *G06F 17/30* (2013.01)
USPC ........... 711/162; 711/111; 711/114; 711/118; 707/822; 707/823; 707/825; 707/831

(58) Field of Classification Search
USPC ........................ 707/1–2, 10, 100, 102, 103 R, 707/103 X–103 Z, 200, 202–203, 204–206, 707/609, 611, 626, 655–660, 821–825, 707/828–829, 831; 711/114–118, 170–171, 711/100, 162, 111, 168, 203; 726/26; 714/11; 709/203, 218–220
See application file for complete search history.

(56) References Cited

U.S. PATENT DOCUMENTS

| | | | |
|---|---|---|---|
| 5,568,629 A | 10/1996 | Gentry et al. ................. 395/441 |
| 5,778,411 A * | 7/1998 | DeMoss et al. .................... 711/4 |
| 5,864,655 A * | 1/1999 | Dewey et al. ..................... 714/7 |
| 5,889,934 A | 3/1999 | Peterson ................... 395/182.04 |
| 5,999,930 A * | 12/1999 | Wolff .................................. 707/8 |
| 6,061,770 A * | 5/2000 | Franklin ......................... 711/162 |
| 6,260,120 B1 * | 7/2001 | Blumenau et al. ............. 711/152 |
| 6,289,356 B1 | 9/2001 | Hitz et al. ...................... 707/201 |
| 6,421,684 B1 * | 7/2002 | Cabrera et al. ................ 707/200 |
| 6,757,694 B2 * | 6/2004 | Goodman et al. .......... 707/104.1 |
| 6,792,518 B2 * | 9/2004 | Armangau et al. ........... 711/162 |
| 6,912,548 B1 * | 6/2005 | Black ............................. 707/200 |
| 7,111,147 B1 * | 9/2006 | Strange et al. ................ 711/209 |
| 7,127,577 B2 | 10/2006 | Koning et al. ................ 711/162 |
| 7,237,021 B2 | 6/2007 | Penny et al. .................. 709/223 |
| 2001/0047482 A1 * | 11/2001 | Harris et al. .................. 713/200 |
| 2004/0068636 A1 * | 4/2004 | Jacobson et al. ............. 711/203 |
| 2004/0103104 A1 * | 5/2004 | Hara et al. ..................... 707/100 |
| 2005/0204108 A1 * | 9/2005 | Ofek et al. ..................... 711/162 |
| 2005/0278478 A1 * | 12/2005 | Takeda et al. ................. 711/101 |
| 2007/0088702 A1 | 4/2007 | Fridella et al. .................. 707/10 |

OTHER PUBLICATIONS

Sameshan Perumal et al. "A Tutorial on RAID Storage Systems", May 6, 2004, pp. 1-23.*
Russinovich, Mark, "Windows Administration : Inside the Windows Vista Kernel: Part 2" http://www.microsoft.com/technet/technetmag/issues/2007/03/VistaKernel/.
U.S. Appl. No. 11/336,756, filed Jan. 19, 2006.

(Continued)

*Primary Examiner* — Srirama Channavajjala
(74) *Attorney, Agent, or Firm* — Perkins Coie LLP

(57) ABSTRACT

An updateable list is provided for use in mounting a storage volume. Such list may include a plurality of block references capable of being used to access corresponding blocks required for mounting the storage volume. In use, such list may be utilized for accessing the blocks in a more efficient manner, by accessing a plurality of such blocks in parallel, as well as performing the block accessing and storage volume mounting in parallel.

41 Claims, 8 Drawing Sheets

(56) References Cited

OTHER PUBLICATIONS

U.S. Appl. No. 11/394,431, filed Apr. 1, 2006.
EMC Data Sheet, "EMC Symmetrix DMX Series, The World's Most Trusted Storage Platform", 8 pages (2008).
EMC Press Release, "EMC²® Where Information Lives®. EMC in Major Storage Performance Breakthrough; First with Enterprise-Ready Solid State Flash Drive Technology", http://www.prnewswire.com/mnr/emc/31368, 3 pages. Webcast: David Donatelli Discusses EMC's Latest Storage Innovation (Jan. 14, 2008).
Gal, E. and Toledo, S., "Algorithms and Data Structures for Flash Memories". School of Computer Science, Tel-Aviv University. *ACM Journal*. pp. 1-30 (Jul. 2004).

"Data ONTAP™ 5.2 System Administrator's Guide, Snapshots", Chapter 10, Network Appliance, Inc. (Sep. 1998) pp. 259-280.
Fisch, M., "NetApp FlexVol and FlexClone Raise the Rate of Return on Storage Resources", The Clipper Group Navigator™, (Nov. 15, 2004), Report #TCG2004094, pp. 1-3.
"Storage Solutions, FlexVol™ and FlexClone™ Software", Network Appliance, Inc. (2004) Two (2) pages.
"Understanding aggregates and volumes, The physical layer of Data ONTAP data storage—aggregates, plexes, RAID groups, and LUNs", gFiler™ Gateway Series, Planning Guide, Chapter 4: Planning for Storage Management, Network Appliance, Inc. (Oct. 19, 2004), pp. 1-7.
Co-pending U.S. Appl. No. 12/028,717, filed Feb. 8, 2008.

* cited by examiner

SYSTEM AND METHOD FOR MOUNTING A STORAGE VOLUME UTILIZING A BLOCK REFERENCE LIST

FIELD OF THE INVENTION

The present invention relates to storage systems, and more particularly to mounting a storage volume.

BACKGROUND

A storage server is a special purpose processing system used to store and retrieve data on behalf of one or more clients. A file server is an example of a storage server. A file server operates on behalf of one or more clients to store and manage shared files in a set of mass storage devices, such as magnetic or optical storage-based disks or tapes. In various prior art systems, the mass storage devices may be organized into one or more groups of disks [e.g. redundant array of inexpensive disks (RAID), etc.]. These disks, in turn, define an overall logical arrangement of storage space including one or more storage volumes.

The aforementioned file server further includes a storage operating system that implements a file system to logically organize data as a hierarchical structure of directories and files on the foregoing disks. Each on-disk file may be implemented as a set of blocks configured to store data, such as text, whereas a directory may be implemented as a specially-formatted file in which information about other files and directories are stored. One example of such a file system is the Write Anywhere File Layout (WAFL™) file system available from Network Appliance, Inc.

In use, the file server may incorporate various features such as the generation of certain kinds of data storage images. Image generation may, for example, include mirroring, in which a mirror copy of certain data at one location is maintained at another location, snapshots, and/or clones of storage volumes. Mirroring of data may be done for various different purposes. For instance, mirroring provides a mechanism for ensuring data availability and minimizing down time, and may be used to provide disaster recovery. In addition, snapshots provide point-in-time images of data, and clones generally provide a writeable image of data, which may be used for various purposes in data operations.

Before use (e.g. at boot-up, etc.), storage volumes are typically mounted to make the file system accessible. Such mounting involves the attachment of the file system to the file/directory hierarchy. To accomplish this, various metadata (e.g. information describing previous instances of the aforementioned features, etc.) is first required, and is therefore retrieved from specific blocks in the associated storage volume.

Since these different blocks are generally interdependent (e.g. by referencing each other in a hierarchical or tree-like manner, etc.), such blocks are typically retrieved in a serial and/or sequential manner. For example, a first block may be referenced by a second block, etc. Thus, prior to mounting, the second block must be retrieved before the first, etc. Such sequential input/output (I/O) access pattern, in turn, constrains the speed with which the blocks can be retrieved and the mounting completed. The resultant boot-up latency is further exacerbated by the larger number of blocks that are typically required with the incorporation of more features in association with the associated storage volume. Still yet, in situations where multiple storage volumes are to be mounted, latency is even further compounded.

SUMMARY

A system and method are provided for mounting a storage volume in a more efficient manner by at least partially avoiding serial and/or sequential access of blocks (e.g. the interdependent blocks mentioned earlier in the background discussion, etc.). To accomplish this, a list is provided for use in mounting the storage volume. In one embodiment, such list may include a plurality of block references capable of being used to access corresponding blocks required for mounting the storage volume. Such list of block references may be updated based on modifications to one or more of the blocks referenced by the block references. In use, such list may be utilized for accessing the blocks in a more efficient manner, by accessing a plurality of such blocks in parallel, as well as performing the block accessing and storage volume mounting in parallel. For instance, the mounting of the storage volume may be initiated prior to the block accesses being complete.

In another exemplary embodiment, the block references may be utilized to access the blocks in a predetermined order. In one aspect of the present embodiment, this may be accomplished by processing the list to reflect the predetermined order, prior to the list being utilized to access the blocks. As an option, the accessed blocks may even be cached to expedite subsequent access.

In an additional possible embodiments, the list may be updated in a variety of ways. For example, if any change in a file system results in a modification to one or more blocks referenced in the list, the list may be updated to reflect such change. In the context of another example, the list may even be updated to reflect various features (e.g. snapshot, mirror, clone, etc.). As an option, the list may be provided and used in association with a file system independent of the software (e.g. a version thereof, etc.) that is used to read/write the blocks, etc.

In still yet another possible embodiment, the block references may optionally include virtual block references and/or physical block references. In one aspect of the present embodiment, both virtual block references and physical block references may be provided which are mapped to each other. By this feature, the physical block references may be modified (e.g. moved, etc.) without necessarily requiring a modification to the virtual block references, etc.

DETAILED DESCRIPTION

A system and method are provided for mounting a storage volume in a more efficient manner by at least partially avoiding serial and/or sequential access of blocks. In one example of use, when a storage volume is to be mounted to make a file system accessible to a server, a list may be communicated to such server. This list may then be used by the server for accessing blocks referenced in the list in a more efficient manner.

Just by way of example, such list may be utilized for accessing a plurality of the blocks in parallel. For instance, retrieval of one block may be requested before another previous block has been fully retrieved, even if such blocks are interdependent in the manner set forth earlier in the background discussion. Block access efficiency may also be provided by performing the block accessing and storage volume mounting in parallel. For instance, the mounting of the storage volume may be initiated prior to the block accesses being complete, etc. To this end, in various embodiments, an amount of time it takes to mount the storage volume may be reduced. More information with now be set forth regarding the underlying framework with which the foregoing technique is made possible.

Figure 1:
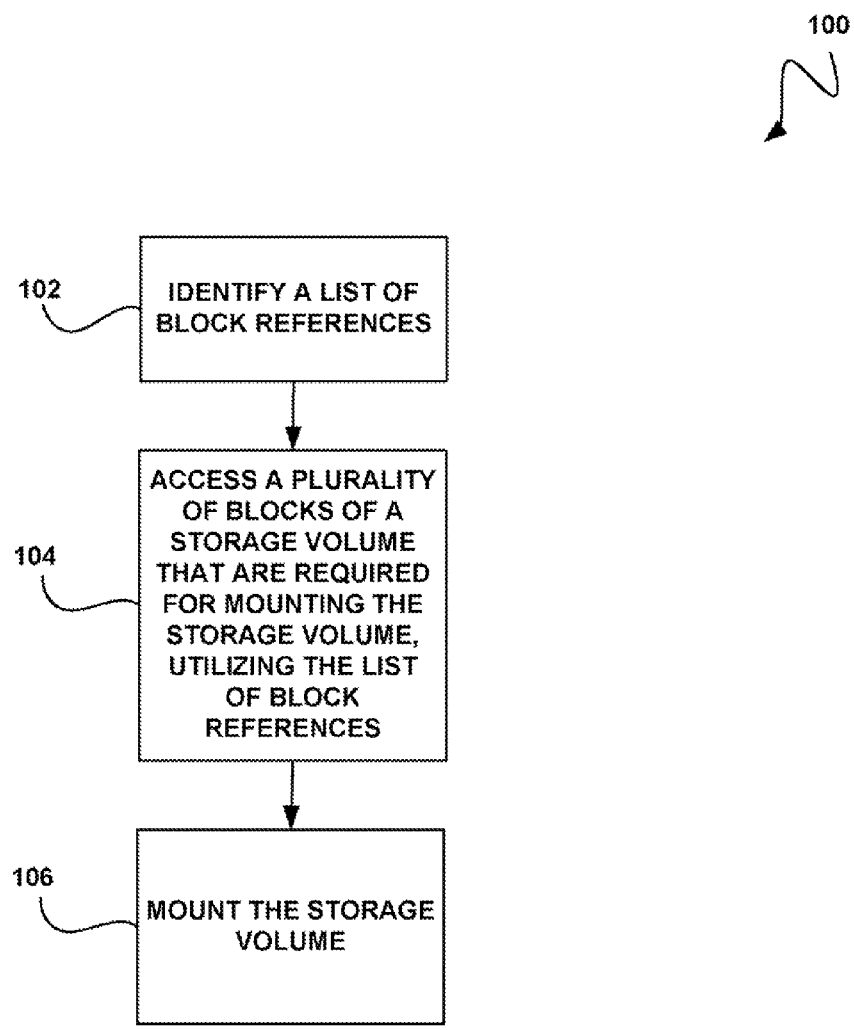
FIG. 1 illustrates a method for mounting a storage volume, in accordance with one embodiment.

FIG. 1 illustrates a method 100 for mounting a storage volume, in accordance with one embodiment. In the context of the present description, such storage volume refers to any logical data set that is an abstraction of physical storage, combining one or more physical storage devices (e.g. disks, etc.) or parts thereof, into a logical storage object. The physical storage device(s) underlying a storage volume may vary in different implementations, examples of which will be set forth in the context of different embodiments to be described hereinafter in greater detail during reference to subsequent figures.

In one optional embodiment, the storage volume may include a flexible storage volume that is flexibly associated with the underlying physical storage device(s). Of course, in other embodiments, a traditional storage volume is contemplated where the storage volume is mapped directly and inflexibly to the underlying physical storage device(s).

Also in the context of the present description, the aforementioned mounting refers to any association of a file system with a file hierarchy, for making the file system accessible. Such file system, in turn, refers to any organization of data in a structured manner, including, but not limited to traditional file systems and other data storage. Of course, such mounting may be repeated as necessary (e.g. after any un-mounting, etc.), and thus include any sort of re-mounting, etc.

With reference to FIG. 1, a list of block references is identified. See operation 102. As used herein, such list refers to any data structure capable of storing the block references each of which, in turn, includes any object that is capable of identifying or being used to identify at least one block (i.e. any set of data) in an associated storage volume. For example, in various embodiments, the block references may include virtual block references, physical block references, etc.

In different embodiments, the list of block references may be stored in the storage volume or in any accessible location, for that matter. Further, the list may be linked or otherwise associated with a particular storage volume. Thus, in one embodiment, the list may be identified by first identifying the storage volume to be mounted in response to an automated and/or manual mounting request, and then locating the corresponding list (e.g. via a pointer, etc.). Of course, the list may be identified in any desired manner.

As set forth in operation 104, the block references may be used to access blocks required for mounting the storage volume. In one embodiment, such block references may each refer to (or be used to identify) a location of a corresponding block in the storage volume. Thus, such location may, in turn, be used to retrieve the associated block, thus making it accessible.

By this feature, the storage volume may thus be mounted utilizing the list of block references. See operation 106. As mentioned earlier, such mounting refers to an association of a file system with a file hierarchy, for making the file system accessible.

In various exemplary embodiments, a plurality of the blocks may be accessed before and/or during the mounting. For example, before completing the accessing of each of the blocks, mounting of the storage volume may be initiated. To this end, the block accessing and storage volume mounting may be performed in parallel. Further, a plurality of the blocks may even be accessed in parallel. In operation, such features may optionally be used to avoid, at least in part, serial and/or sequential access of the blocks and subsequent mounting, particularly when interdependent blocks exist. A duration required for mounting the storage volume may thus be optionally reduced.

As another option, additional efficiencies may be provided by organizing the manner in which the blocks are accessed, for further reducing latency. For example, the block references may be utilized to access the blocks in a predetermined order. This may be accomplished by automatically processing the list to reflect the predetermined order, prior to the list being utilized to access the blocks. To this end, certain blocks may be accessed before or simultaneously (e.g. batched, etc.) with others to more efficiently obtain the information required for mounting.

In one embodiment, the predetermined order may be configured to ensure that blocks that are required first in the mounting process are accessed prior to other blocks which are required later in the process. To this end, the mounting process may be initiated faster, as will be elaborated upon later.

In another embodiment, such predetermined order may be configured to optimize I/O bandwidth. Specifically, the order of the block references may be configured to group certain block references together (so that the corresponding blocks are accessed as one or more groups). I/O from a storage subsystem may thus be optimized, since the number of I/O requests may be reduced, and larger chunks of data may be requested from a physical storage device in each individual request, effectively improving the I/O performance of the system (e.g. by reducing the impact of physical storage device seek times, etc.).

In still additional embodiments, the blocks may even be accessed from one or more physical storage devices (e.g. disks, etc.) prior to mounting, such that the blocks may be cached. Thus, during mounting, the blocks may be accessed directly from cache, instead of the physical storage devices. This may further reduce any latency required during mounting. More information regarding a different embodiment that incorporates similar pre-processing/caching features will be set forth hereinafter in greater detail during reference to FIG. 2. As an option, the aforementioned list may be used to avoid a situation where the same block is read more than once (e.g. once for each storage volume, etc.), which would otherwise result in redundant input/output (I/O). Utilizing the list and the aforementioned caching, a feature may be provided for ensuring that each block is read only once.

In different illustrative embodiments, the list may be generated and even updated based on various additional factors. For example, it may be determined whether any change has been made in the configuration of various features (e.g. a snapshot, a mirror, a clone, etc.), in association with blocks referenced in the list. Such change may refer to, but is certainly not limited to enabling, disabling, modifying, etc. such features, for example. Specifically, some features, by their nature, result in corresponding blocks remaining unmodified (e.g. written to, moved, etc.). Further, such features may share blocks with an active file system, etc. which modifies blocks in a frequent manner. In one embodiment, the list may be managed with such features taken into account so that, for example, movement of a shared block does not impact a feature associated with the block, etc. More information regarding a different embodiment that incorporates a similar feature will be set forth hereinafter in greater detail during reference to FIG. 3.

Even still, the list may also be adaptive in nature. For example, if any change (e.g. write, etc.) in a file system results in a modification to a block referenced in the list (e.g. by adding, deleting, changing, etc. at least one block that may be associated with a file, etc.), such list may be updated to reflect such change. Other exemplary embodiments where the list is adaptive in nature may involve copy-on-write (COW) snapshots, defragmenters, etc. More information regarding a different embodiment that incorporates a similar feature will be set forth hereinafter in greater detail during reference to FIG. 4.

As indicated earlier, more illustrative information will now be set forth regarding various optional architectures and features of different embodiments with which the foregoing technique may or may not be implemented, per the desires of the user. It should be strongly noted that the following information is set forth for illustrative purposes and should not be construed as limiting in any manner. Any of the following features may be optionally incorporated with or without the other features described.

Figure 2:
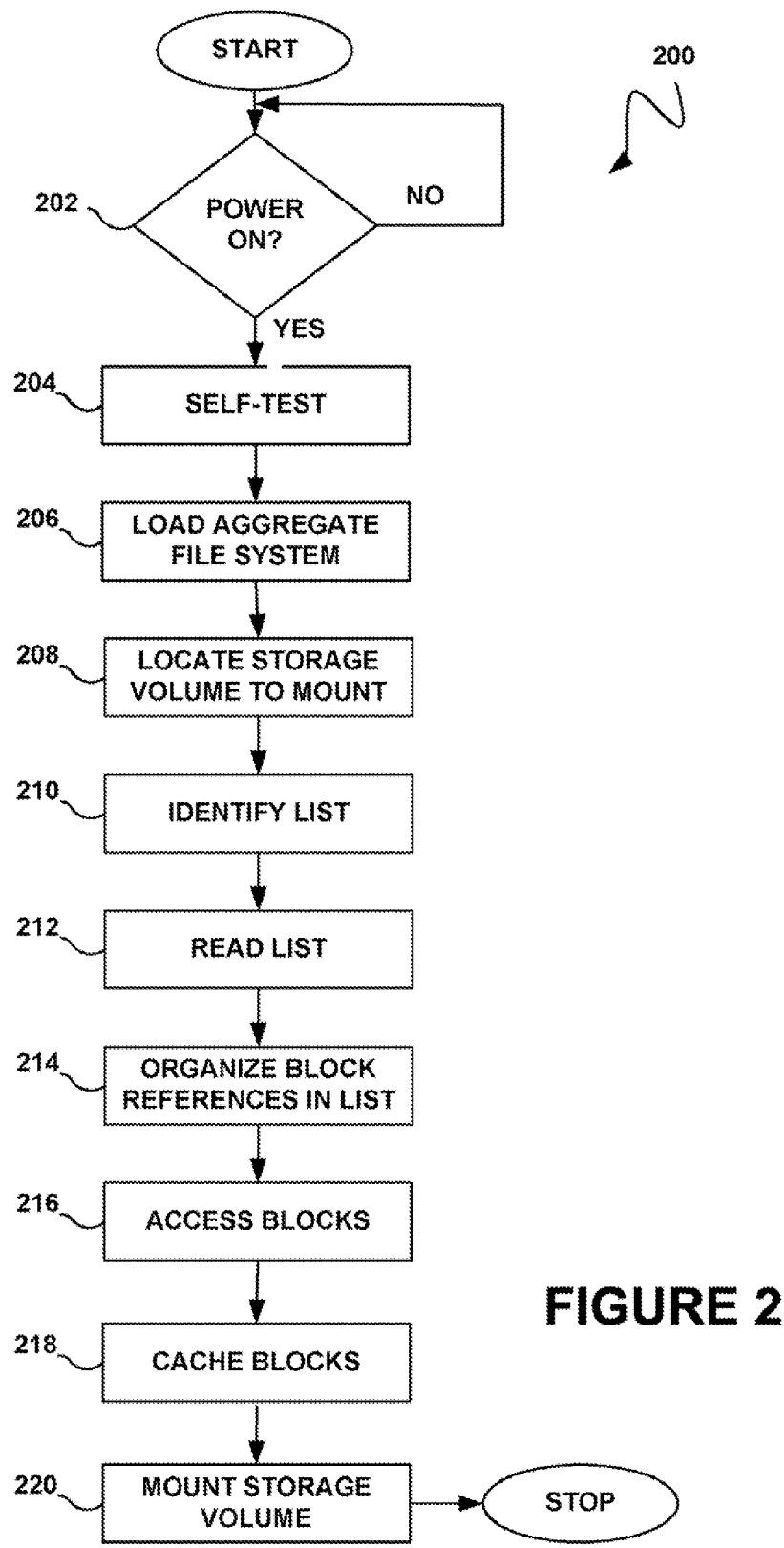
FIG. 2 illustrates a boot-up sequence that results in a storage volume being mounted, in accordance with another embodiment.

FIG. 2 illustrates a boot-up sequence 200 that results in a storage volume being mounted, in accordance with another embodiment. As an option, the boot-up sequence 200 may be carried out in the context of the method 100 of FIG. 1. Of course, however, it should be noted that the boot-up sequence 200 may be used in any desired environment. For example, the boot-up sequence 200 may reflect one associated with a file system environment available from Network Appliance, Inc. Further, the definitions provided above equally apply to the present description.

As shown, it is first determined whether a device has been powered-on. See decision 202. In one embodiment, the decision 202 may be made based on an inspection of a power state of a file server and/or the receipt of a power-on signal, for example. Once a power-on situation has occurred, a self-test is performed in operation 204. An aggregate file system is then loaded (e.g. by retrieving it from memory, etc.). See operation 206. One or more storage volumes to be mounted are then located in operation 208. For example, such storage volume(s) may be located by referencing a network map or the like at a file server that indicates the locations of different storage volumes, etc. Such storage volume(s) may include any of those that are to be made accessible after boot-up.

A list associated with each such storage volume is then identified in operation 210. As mentioned earlier, the list may be linked or otherwise associated with the storage volume located in operation 208. Thus, in one embodiment, the list may be identified by first identifying the storage volume to be mounted, and then locating the corresponding list (e.g. via a pointer, etc.). It should be noted that the list may be situated in any desired location, examples of which will be set forth during reference to FIG. 5.

In different embodiments, the list may take the form of a file or any other data structure capable of maintaining the list and being associated with the corresponding storage volume in some manner. It should be noted that the list may be created/updated in any desired manner, examples of which will be set forth in the context of different embodiments described during reference to FIGS. 3-4.

Upon identifying the list, the list may be read in operation 212. Table 1 illustrates an exemplary list including a plurality of block references that take the form of physical block references, in accordance with one possible embodiment. In one embodiment, such a list may be referred to as a "playlist." Of course, such list is set forth for illustrative purposes only and should not be construed as limiting in any manner.

Table 1

Physical Block Location__1
Physical Block Location__2
Physical Block Location__3
Physical Block Location__4

While other more complex arrangements (e.g. tree-structures, etc.) are contemplated, the list may, in one embodiment, include a simple ordered list of block references. As shown in Table 1, each of the block references may refer to a location where a corresponding block may be found.

In various other embodiments involving a flexible storage volume, the foregoing list may be augmented to include not only physical block locations, but virtual block references as well. Table 2 illustrates an exemplary list of block references that take the form of both virtual and physical block references, in accordance with another embodiment.

Table 2

Virtual Block Reference__1←→Physical Block Location__4
Virtual Block Reference__2←→Physical Block Location__3
Virtual Block Reference__3←→Physical Block Location__2
Virtual Block Reference__4←→Physical Block Location__1

Again, such list is set forth for illustrative purposes only and should not be construed as limiting in any manner. As shown, the virtual block references may be mapped to various one or more physical block references.

As mentioned earlier, the aforementioned block references may be used to access blocks required for mounting the storage volume. Such information may, in one embodiment, include information specific to a particular file system. One example of such a file system is the Write Anywhere File Layout (WAFL™) file system available from Network Appliance, Inc. in which modified blocks may be written to different (e.g. new, etc.) locations, various details of which are described in more detail in U.S. Pat. No. 6,289,356, which is incorporated herein by reference in its entirety. Examples of WAFL-specific information that may be stored in the referenced blocks may include, but is not limited to feature-related information (e.g. one or more snapshot files, etc.), an inode map, an active map, a summary map, an inofile, a kireeti file, a qtree, metadata, etc.

Of course, such information contained in the referenced blocks may include any information that is required for mounting an associated storage volume. For instance, in a non-WAFL system, blocks may be referenced which include any information required to initiate any desired I/O (e.g. block access requests/block retrievals, etc.) or to carry out any other functionality in association with storage volume mounting.

With continuing reference to FIG. 2, the block references in the list may optionally be organized to control various I/O. See operation 214. Such organization may result in the block references being positioned in a predetermined order. As mentioned earlier, such predetermined order may be configured to optimize I/O bandwidth, etc.

After such organization, the block references may be spawned to retrieve the corresponding blocks from one or more physical storage devices underlying the storage volume. Note operation 216. In one embodiment where the list takes the form set forth in Table 2, the blocks may be organized in a way to make block accesses more efficient.

For example, prior to being accessed in operation 216, the physical block references may be modified (e.g. by re-organizing, re-ordering, the same) without necessarily modifying the virtual block references, etc. Specifically, in one exemplary embodiment, a plurality of blocks may be read from a first set of un-contiguous physical locations and then re-written to a second set of contiguous physical locations, thus enabling a more efficient subsequent retrieval of the same. In the context of Table 2 above, such technique may result in the re-organization or re-ordering of the illustrated physical block locations. In use, the aforementioned contiguous physical locations may therefore be referred to as an extent (e.g. starting address and length).

Again, such optional optimization may be accomplished without necessarily making any changes to the virtual block references. To this end, the physical location modifications may be made transparent to a file system, and the virtual block references may be managed more flexibly regardless as to whether the corresponding physical location(s) was originally allocated to the flexible storage volume. More information regarding various similar techniques that may be employed given the framework of Table 2 can be found with reference to a co-pending application having U.S. patent application Ser. No. 11/336,755 entitled "Method and Apparatus for Defragmentation and for Detection of Relocated Blocks" which was filed on Jan. 19, 2006 under names Robert M. English and Ashish Prakash as inventors, and which is incorporated herein by reference in its entirety for all purposes.

As an additional option, prior to mounting, the blocks accessed in operation 216 may be cached in a buffer. See operation 218. With the necessary block(s) accessed, the storage volume mounting may be initiated, per operation 220. Thus, by caching the blocks in operation 218, the blocks may be accessed directly from the buffer, instead of one or more disks, for example. This may further reduce any latency associated with mounting.

As mentioned earlier, the block references may be organized in a predetermined order to ensure that blocks that are required first in the mounting process are accessed prior to other blocks which are required later in the process. For example, various metadata (e.g. information describing previous instances of a snapshot, a mirror, a clone, etc.) is required before mounting, and therefore must be first retrieved from specific blocks in the associated storage volume.

By using this predetermined order, contrary to the appearance of the flow in FIG. 2, the subsequent mounting operation (see operation 220) may be initiated before operations 216 and/or 218 are completed. In other words, as soon as a first required block is accessed and cached, operation 220 may optionally begin for further reducing latency.

Figure 3:
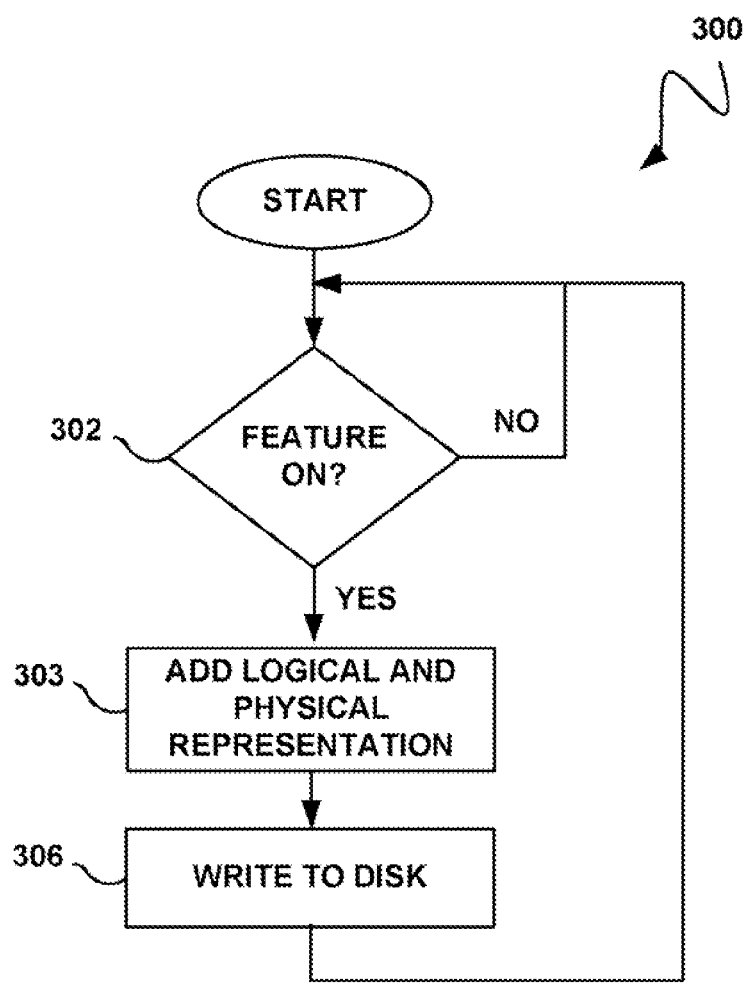
FIG. 3 illustrates a method for generating/updating a list utilizing an application program interface (API), in accordance with another embodiment.

FIG. 3 illustrates a method 300 for generating/updating a list utilizing an application program interface (API), in accordance with another embodiment. As an option, the method 300 may be carried out to generate/update a list prior to its use in the context of the methods of FIGS. 1-2. Of course, however, it should be noted that the method 300 may be used in any desired environment. Further, the definitions provided above equally apply to the present description.

As mentioned earlier, the list may be created in any desired manner. For example, the list may be created whenever an associated flexible storage volume is created. In another embodiment, a storage volume may be first mounted for the specific purpose of using a recorder feature to track and log which block requests are made for such mounting. Such recorder feature may include software that resides, for example, at the file server for monitoring the block requests for the specific purpose of identifying block reference locations from which the requested blocks are being retrieved. To this end, the identified block references may be saved in a list for use during a subsequent instance of mounting. By this feature, the list may be provided and used in association with a file system independent (i.e. regardless) of the software (e.g. a version thereof, etc.) that is used to read/write the blocks, etc.

In the embodiment specifically set forth in FIG. 3, an API (e.g. a file interest API, etc.) may be used to create and populate the list. Such API may map various features to certain blocks that hold information required for such feature. Thus, in various embodiments, the initiative for populating the list may be delegated to a developer. Further, by using such an API, the list may be generated without necessarily incurring the expense of the aforementioned recorder feature.

As shown, it is determined whether a particular feature (e.g. a snapshot, a mirror, a clone, etc.) is enabled (e.g. turned on, activated, etc.). See decision 302. The foregoing exemplary features, by their nature, result in the modification (e.g. writing, moving, etc.) of corresponding blocks required during mounting. Of course, such features should not be construed as limiting in any manner. For example, any desired feature capable of being executed in association with the storage volume may trigger a list update.

As used herein, the aforementioned snapshot refers to a point-in-time image of data. In one embodiment, a snapshot includes a read-only, persistent, point-in-time image (PPI) of data, such as a storage volume or a logical unit number (LUN). For example, a snapshot may include, but is not limited to a NetApp SnapShot™ of Network Appliance, Inc. Blocks that may be referenced in the list when a snapshot is enabled may include, but are not limited to those that store snapshot files, an associated data image, etc.

Also in the context of the present description, the clone refers to a writeable copy of data. In one embodiment, a clone includes a writeable copy of a storage volume. For example, a clone may include, but is not limited to a FlexClone™ of Network Appliance, Inc. Blocks that may be referenced in the list when a clone is enabled may include, but are not limited to those that store clone files, an associated data image, etc.

As further used herein, the foregoing mirror refers to a duplicate copy of data that is present in another location. In one exemplary embodiment, a mirror includes a storage volume that contains a read-only copy of data from an active file system of another volume. For instance, a mirror may include, but is not limited to data produced by SnapMirror® of Network Appliance, Inc. Blocks that may be referenced in the list when a mirror is enabled may include, but are not limited to those that store mirror files, an associated data image, etc.

In a system with mirroring capabilities, a first synchronous mode is contemplated whereby data may be mirrored or replicated from a source storage server to a destination storage server. During use in such first synchronous mode, any update on the source storage server is synchronized with a mirror on the destination storage server. This may require that the source storage server and the destination storage server be equipped with the same operating system. In the present embodiment, both the source storage server and the destination storage server each has an associated list. Upon each update synchronization, the destination storage server may be provided with an updated list, reflecting such latest update.

In another embodiment, a second asynchronous mode may be implemented whereby snapshots of the appropriate storage volume(s) of the source storage server are transferred to the destination storage server. While the present embodiment does not necessarily require the same versions of software to be running on the source and destination storage servers, the destination storage server is charged with the task of generating its own list. To accomplish this in accordance with one embodiment, the destination storage server may employ the aforementioned recorder feature for identifying the appropriate list of block references. Thus, the present embodiment may be software version-independent, since a first version of software may be installed on a source and a second version of the software may or may not be used in association with a destination.

Figure 4:
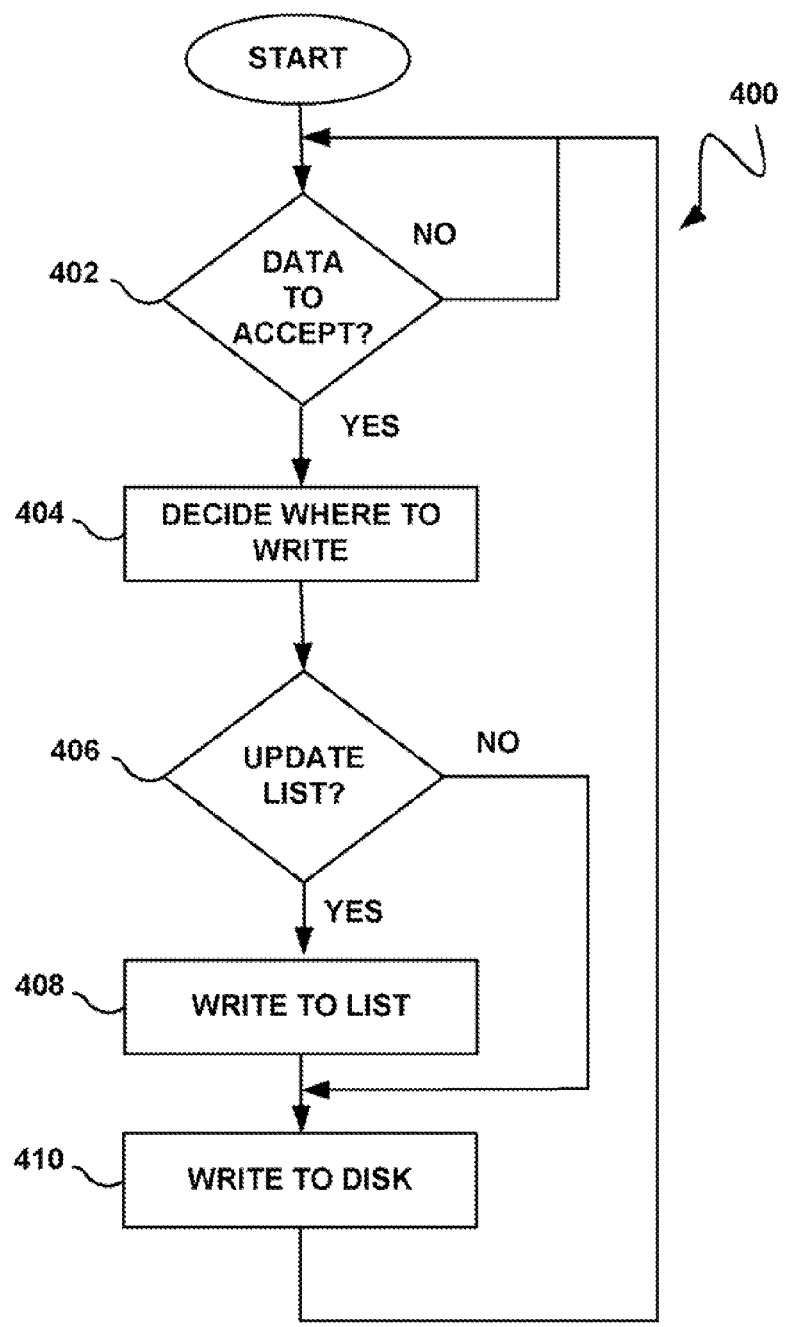
FIG. 4 illustrates a method for updating a list based on accepted data to be written to a physical storage device, in accordance with another embodiment.

FIG. 4 illustrates a method 400 for updating a list based on accepted data to be written to a physical storage device, in accordance with another embodiment. As an option, the method 400 may be carried out prior to the methods of FIGS. 1-2. Of course, however, it should be noted that the method 400 may be carried out in any desired environment. Further, the definitions provided above equally apply to the present description.

As mentioned earlier, the list may be adaptive in nature after it is generated. For example, if any change (e.g. write, etc.) in a file system results in a modification to a block referenced in the list (e.g. the block is moved, etc.), the list may be updated to reflect such change. In various embodiments, such update may involve a block reference being removed from the list (e.g. when a corresponding block has been deleted, etc.), and/or a block reference being added/modified (e.g. when a corresponding block has been added/moved, etc.).

As shown in FIG. 4, it is determined when data is accepted for writing to a physical storage device (e.g. disk, etc.). See decision 402. Upon it being determined that data exists to be accepted per decision 402, data is accepted. After acceptance, it is decided where to write the data. See operation 404.

It is then determined whether the list should be updated in decision 406. Such determination involves an analysis of a destination and/or content associated with the write operation, in order to ascertain whether such write impacts one or more of the blocks that are currently referenced in the list. For example, a write operation may serve to move one of the blocks referenced in the list from a first physical location to a second physical location on the physical storage device.

As mentioned earlier, an API (e.g. file interest API, etc.) may be utilized in conjunction with decision 406. In such embodiment, this API may be used to identify situations where a list update may not necessarily be required based on any changing factors in the operating environment. For example, a previous version of an application may require a predetermined set of blocks (e.g. root directory, etc.) to be loaded when mounting, while a subsequent version does not. In such situation, the API may recognize the switch between versions and associated ramifications (e.g. the fact that the root directory is no longer required, etc.), so that the list need not necessarily be updated when the root directory is updated, etc. with the accepted data.

If it is determined that the list should be updated, one or more block references is written. Note operation 408. To this end, the list may be maintained up to date, despite changes made to a file system.

Regardless as to whether the list is updated in decision 408, the physical storage device is written with the accepted data. See operation 410. While not necessarily shown, operation 408 may be performed coincidentally with operation 410. To this end, if any change (e.g. write, etc.) in a file system results in a modification to a block referenced in the list (e.g. a block is moved, etc.), such list may be updated to reflect such change.

Figure 5:
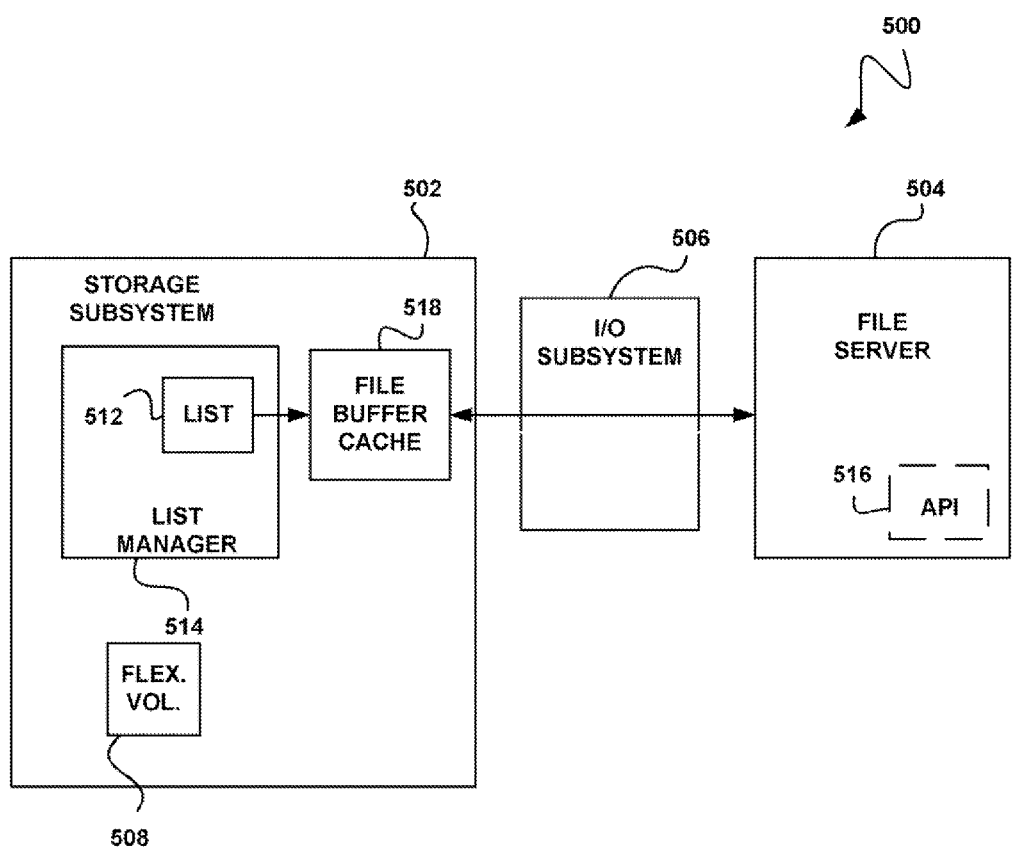
FIG. 5 illustrates a framework for mounting a storage volume, in accordance with another embodiment.

FIG. 5 illustrates a framework 500 for mounting a storage volume, in accordance with another embodiment. As an option, the framework 500 may be used to carry out the various methods of FIGS. 1-4. Of course, however, it should be noted that the framework 500 may be used in any desired environment. Further, the definitions provided above equally apply to the present description.

As shown, included is a storage subsystem 502 including a logical aggregation of physical data storage (e.g. disks, etc.). The storage subsystem 502 communicates with a file server 504 via an I/O subsystem 506. In one embodiment, the file server 504 may be a file server offered by Network Appliance, Inc. The storage subsystem 502 includes at least one flexible storage volume 508, and a list 512 that is specifically allocated to the flexible storage volume 508. Such list 512 may include that which was described during reference to the previous figures. It should be noted that, while a single list 512 and associated flexible storage volume 508 are shown in FIG. 5, a plurality of flexible storage volumes may be provided each with a corresponding list.

As shown, the list 512 may be stored outside the flexible storage volumes 508, but yet still inside the associated storage subsystem 502. In other words, the list 512 may be stored on one or more disks that make up the storage subsystem 502 and that is/are further used to store the flexible storage volume 508. Of course, other embodiments are contemplated where the list 512 is located anywhere inside or outside the storage subsystem 502. For example, the list 512 may be stored in a cache, removable memory (e.g. flash card, etc.), any high-speed memory that operates faster than the disk(s) associated with the storage subsystem 502, and/or in any accessible location, for that matter. In the embodiment shown in FIG. 5, the list 512 may be stored in a file buffer cache 518. Again, such file buffer cache 518 may include any memory that operates faster than the disk(s) associated with the storage subsystem 502.

Further provided is a list manager 514 for generating, updating, and/or utilizing the list 512 in accordance with any of the functionality set forth in the context of the previous figures. In one embodiment, the list manager 514 may be configured to avoid any restrictions or impact on normal file system/server operation and may also optionally be invisible in such capacity. Also, an API 516 may work in conjunction with the list manager 514 to interface the list 512 for updating the same during use. See the methods of FIGS. 3 and 4, for example. As an option, the API 516 may be made accessible at the file server 504 in the manner shown, and/or at any other location, for that matter.

When the flexible storage volume 508 is to be mounted, the list 512 may be accessed by the list manager 514 and communicated to the file server 504 via the I/O subsystem 506. As an option, the list 512 may be further processed for accessing blocks referenced in the list 512 in a predetermined order. As an option, such accessed blocks may be stored in cache memory (e.g. file buffer cache 510, etc.). Of course, such caching of the blocks may occur at any location associated with the storage subsystem 502 and/or file server 504.

To this end, the accessed blocks may be efficiently communicated with the file server 504 via the I/O subsystem 506. In one possible embodiment, storage volume mount duration may be reduced by a factor of 10. Of course, embodiments with more or less performance benefits are also contemplated where such benefit may vary as a function of a load (e.g. number of features, etc.) implemented in conjunction with the flexible storage volume 508.

Figure 6:
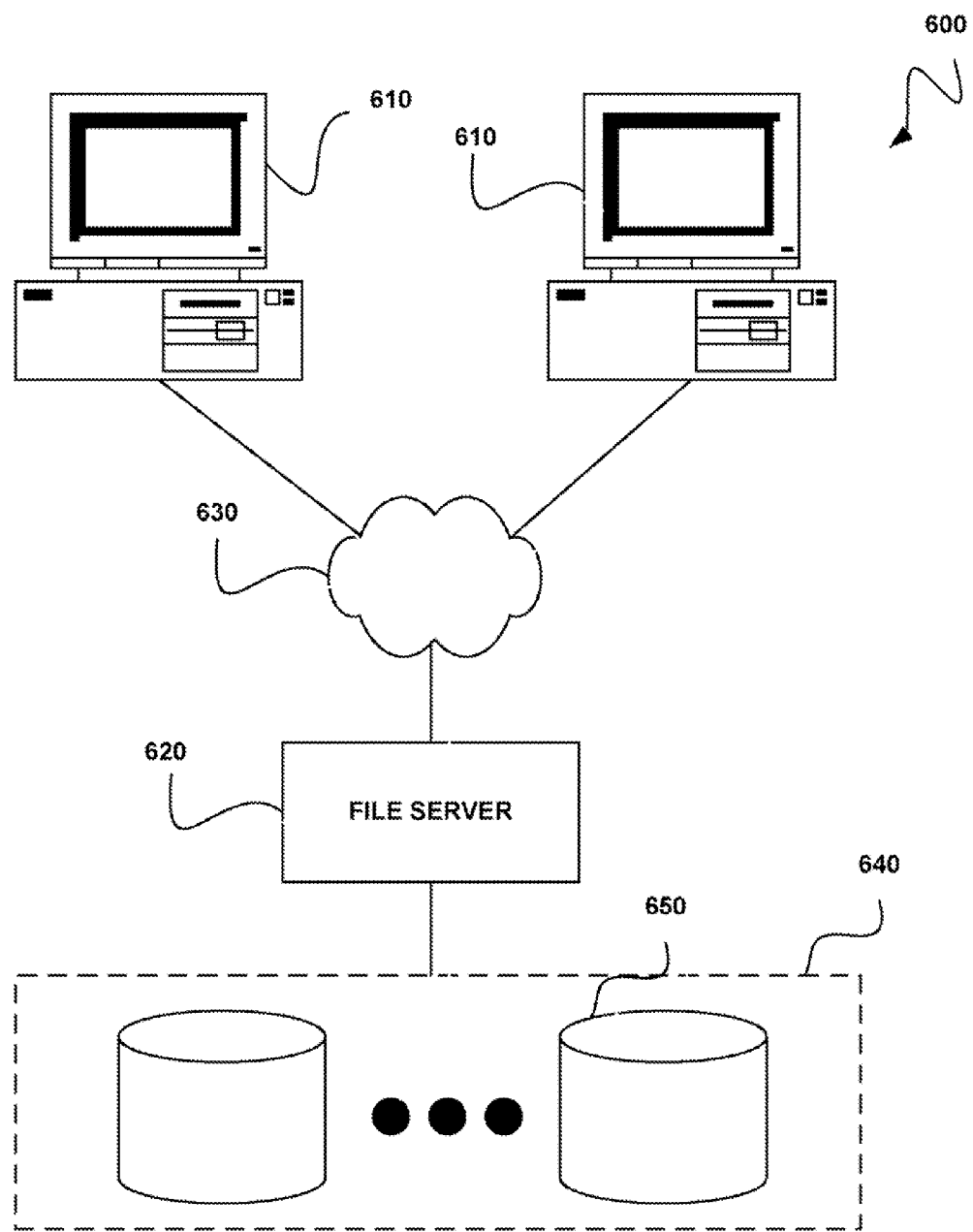
FIG. 6 is an illustration of a network environment in which an embodiment may be implemented.

FIG. 6 is an illustration of a network environment 600 in which an embodiment may be implemented. As an option, the network environment 600 may incorporate the framework 500 of FIG. 5. For example, the file server 620 of FIG. 6 may include the file server 504 of FIG. 5. Further, the storage subsystem 640 of FIG. 6 may include the storage subsystem 502 of FIG. 5. Of course, however, it should be noted that the network environment 600 may be used in any desired environment and incorporate any one or more of the features described in the previous figures.

Of course, the various embodiments described herein are not limited to any particular environment, and may be implemented in various storage processes. In the present illustration, the storage system includes a storage server, such as the file server 620. The file server 620 is coupled with the storage subsystem 640, which includes a set of mass storage devices 650, and to a set of clients 610 through a network 630, such as a local area network (LAN) or other type of network. Each of the clients 610 may be, for example, a conventional personal computer (PC), workstation, or the like.

The storage subsystem 640 is managed by the file server 620. For example, the file server 620 may receive and respond to various read and write requests from the clients 610, directed to data stored in or to be stored in the storage subsystem 640. The mass storage devices 650 in the storage subsystem 640 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

The file server 620 may have a distributed architecture, for example, it may include separate N-module (network module) and D-module (data module) components (not shown). In such an embodiment, the N-module is used to communicate with the clients 610, while the D-module includes the file system functionality and is used to communicate with the storage subsystem 640. In another embodiment, the file server 620 may have an integrated architecture, where the network and data components are all contained in a single box or unit. The file server 620 further may be coupled through a switching fabric to other similar storage systems (not shown) that have their own local storage subsystems. In this way, all of the storage subsystems can form a single storage pool, to which any client of any of the storage systems has access.

Figure 7:
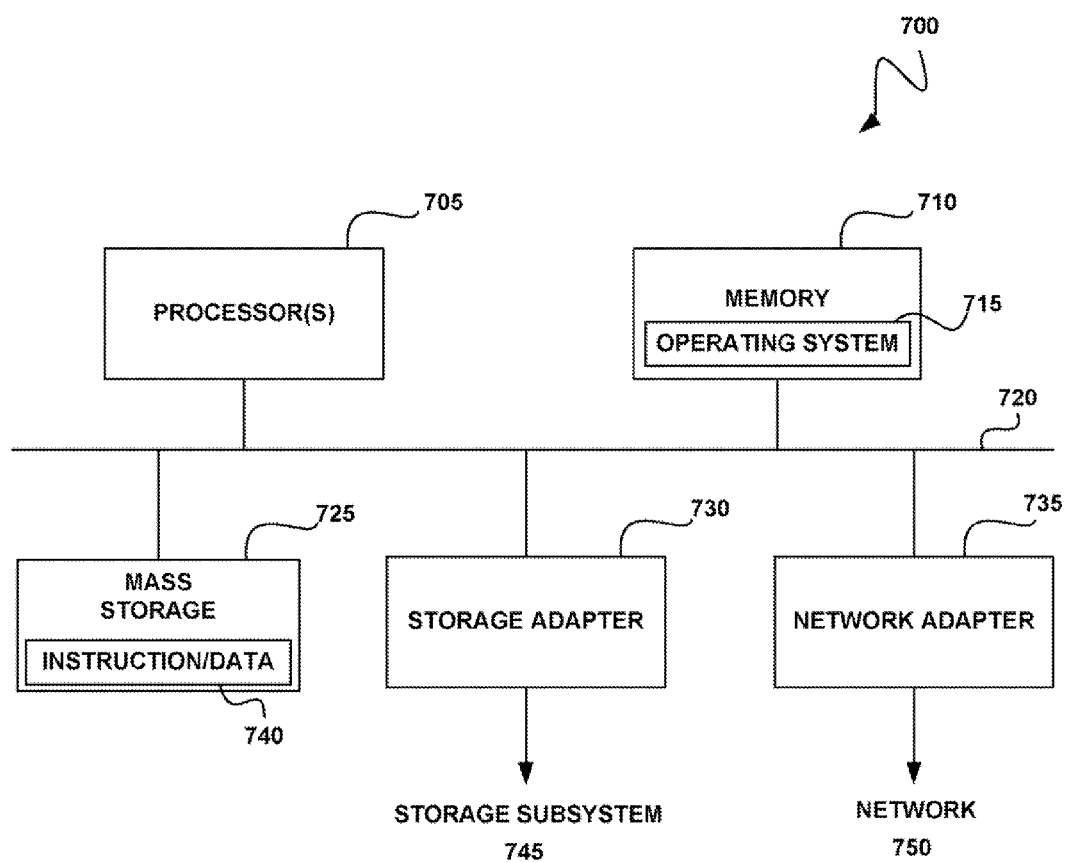
FIG. 7 is a block diagram illustrating an architecture of a file server that may include an embodiment.

FIG. 7 is a block diagram illustrating an architecture of a file server 700 that may include an embodiment. In one embodiment, the file server 700 may represent the file server 620 of FIG. 6. Of course, however, it should be noted that the file server 700 may be implemented in any desired environment and incorporate any one or more of the features described in the previous figures.

The file server 700 includes one or more processors 705 and memory 710 coupled to a interconnect 720. The interconnect 720 shown in FIG. 7 is an abstraction that represents any one or more separate physical buses, point-to-point connections, or both connected by appropriate bridges, adapters, or controllers. The interconnect 720, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 705 may include central processing units (CPUs) of the file server 700 and, thus, control the overall operation of the file server 700. In certain embodiments, the processor(s) 705 accomplish this by executing software stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 is or includes the main memory of the file server 700. The memory 710 represents any form of random access memory (RAM), read-only memory (ROM), flash memory, or the like, or a combination of such devices. In use, the memory 710 stores, among other things, the operating system 715 of the file server 700.

Also connected to the processor(s) 705 through the interconnect 720 may be one or more internal mass storage devices 725, a storage adapter 730 and a network adapter 735. The internal mass storage devices 725 may be or include any medium for storing large volumes of instructions and data 740 in a non-volatile manner, such as one or more magnetic or optical-based disks. The storage adapter 730 allows the file server 700 to access a storage subsystem 745 and may be, for example, a Fibre Channel adapter or a SCSI adapter. The storage adapter 730 may interface with a D-module portion of the file server. The network adapter 735 provides the file server 700 with the ability to communicate with remote devices, such as clients, over a network 750 and may be, for example, an Ethernet adapter. The network adapter 735 may interface with an N-module portion of the file server 700.

Figure 8:
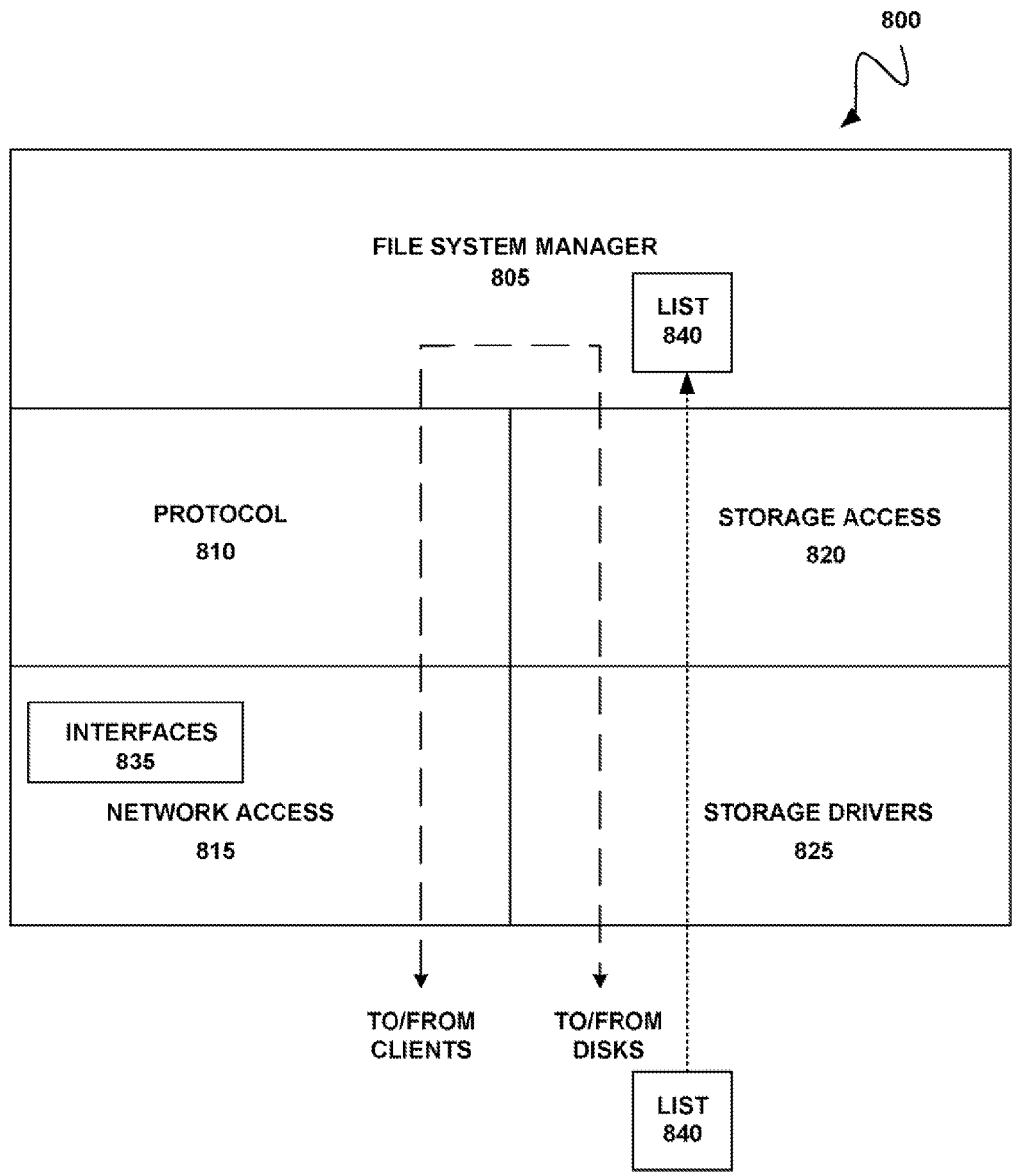
FIG. 8 illustrates an example of an operating system of a file server according to one possible embodiment.

FIG. 8 illustrates an example of the operating system 800 of a file server according to one possible embodiment. As an option, the operating system 800 may be installed on the file server 700 of FIG. 7. Of course, however, it should be noted that the operating system 800 may be used in any desired environment and incorporate any one or more of the features described in the previous figures.

As shown, the operating system 800 includes several modules, or "layers." These layers include a file system manager 805. The file system manager 805 is software that keeps track of the directory structure (hierarchy) of the data stored in a storage subsystem and manages read/write operations on the data (i.e. executes read/write operations on the disks in response to client requests).

The operating system 800 also includes a protocol layer 810 and an associated network access layer 815, to allow a file server to communicate over a network to other systems, such as clients. The protocol layer 810 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 815 includes one or more drivers, which implement one or more lower-level protocols to communicate over the network, such as Ethernet. Interactions between clients and mass storage devices (e.g. disks, etc.) are illustrated schematically as a path, which illustrates the flow of data through the operating system 800.

The operating system 800 further includes a storage access layer 820 and an associated storage driver layer 825 to allow a file server to communicate with a storage subsystem. The storage access layer 820 implements a higher-level disk storage protocol, such as RAID, while the storage driver layer 825 implements a lower-level storage device access protocol, such as Fibre Channel Protocol (FCP) or SCSI. In one embodiment, the storage access layer 820 may implement a RAID protocol, such as RAID-4 or RAID-DP™ (RAID double parity for data protection provided by Network Appliance, Inc.), and therefore may alternatively be referred to as RAID layer 820.

In use, when a storage volume (e.g. storage subsystem 640 of FIG. 6) is to be mounted, a list 840 (e.g. list 512 of FIG. 5) may be communicated from the storage subsystem to the file system manager 805 via the storage access layer 820 and associated storage driver layer 825, in the manner shown. To this end, the list may be processed by the file system manager 805 for accessing blocks referenced in the list in a more efficient manner such that, in various embodiments, storage volume mount duration is reduced. While the list 840 is shown in FIG. 8 to be originally stored at the storage system and subsequently communicated to the file server for use by the file system manager 805, the list 840 may originate from any desired location and be used by any desired component for providing efficient storage volume mounting.

The foregoing description has set forth only a few of the many possible implementations. For this reason, this detailed description is intended by way of illustration, and not by way of limitations. Variations and modifications of the embodiments disclosed herein may be made based on the description set forth herein, without departing from the scope and spirit of the present application.

It is only the following claims, including all equivalents, that are intended to define the scope of the various embodiments. Moreover, the embodiments described above are specifically contemplated to be used alone as well as in various combinations. Accordingly, other embodiments, variations, and improvements not described herein are not necessarily excluded.

What is claimed is:

1. A method comprising:
    identifying in a storage server a list of block references, the list of block references being updated based on modifications to one or more blocks of a storage volume referenced by the block references;
    accessing, in parallel, a plurality of the blocks that are required for mounting the storage volume, by utilizing in the storage server the list of block references, and
    in parallel with the accessing, mounting the storage volume by the storage server.

2. The method of claim 1, wherein the list is stored outside the storage volume.

3. The method of claim 1, wherein the block references include physical block references.

4. The method of claim 3, wherein the block references include virtual block references.

5. The method of claim 4, wherein the virtual block references are mapped to the physical block references.

6. The method of claim 1, wherein the list is communicated to a server that accesses the blocks of the storage volume.

7. The method of claim 1, wherein the block references are utilized to access the blocks in a predetermined order.

8. The method of claim 7, wherein the list is processed to reflect the predetermined order, prior to the block, references being utilized to access the blocks.

9. The method of claim 7, wherein the block references are utilized to access the blocks in the predetermined order for reducing latency.

10. The method of claim 1, wherein a plurality of the blocks are cached prior to the mounting.

11. The method of claim 10, wherein the cached blocks are accessed during the mounting.

12. The method of claim 1, wherein the list is created in response to the storage volume being created.

13. The method of claim 1, wherein the list, is created by recording block requests.

14. The method of claim 13, wherein the block requests are associated with an initial mounting of the storage volume.

15. The method of claim 1, wherein the list is updated in response to a change to a file system associated with the storage volume.

16. The method of claim 1, wherein the list is updated in response to one or more of the blocks being moved from a first location to a second location.

17. The method of claim 1, wherein the list is updated based on a feature associated with one or more of the blocks referenced by the block references.

18. The method of claim 17, wherein the feature is selected from the group consisting of a snapshot, a mirror, and a clone.

19. A computer program product embodied on a computer readable medium, comprising:
    computer code for identifying a list of block references, the list of block references having been updated based on modifications to one or more blocks of a storage volume referenced by the block references;
    computer code for accessing, in parallel, a plurality of the blocks that are required for mounting the storage volume, utilizing the list of block references; and
    computer code for mounting the storage volume, in parallel with the accessing.

20. A network storage system comprising:
    a processor;
    a network adapter through which to communicate with a plurality of storage clients;
    a storage interface through which to communicate with a storage subsystem;
    a memory storing code which, when executed by the processor, causes the network storage system to perform operations including:
        identifying a list of block references, the list of block references having been updated based on modifications to one or more blocks of a storage volume referenced by the block references;
        accessing, in parallel, a plurality of the blocks that are required for mounting the storage volume, by utilizing the list of block references, and
        in parallel with the accessing, mounting the storage volume.

21. The network storage system of claim 20, wherein the list is stored outside the storage volume.

22. The network storage system of claim 20, and further comprising a server in communication with the storage volume, the server for receiving the list and initiating the mounting.

23. The network storage system of claim 22, wherein the server is in communication with the storage volume via, a network.

24. The network storage system of claim 22 wherein, the list is used independent of software that is utilized to write the blocks.

25. The network storage system of claim 22, wherein the storage volume is mounted to make accessible a file system in which modified blocks are written to different locations.

26. The network storage system of claim 20, wherein at least one of the plurality of data blocks accessed in parallel is referenced by at least one other of the plurality of data blocks accessed in parallel.

27. The method of claim 1, wherein at least one of the plurality of data blocks accessed in parallel is referenced by at least one other of the plurality of data blocks accessed in parallel.

28. The computer program product of claim 19, wherein at least one of the plurality of data blocks accessed in parallel is referenced by at least one other of the plurality of data blocks accessed in parallel.

29. A method comprising:
in a storage server, accessing a plurality of data blocks that are required for mounting a storage volume, by utilizing a list of references to the data blocks; and
in parallel with the accessing, mounting the storage volume by the storage server.

30. The method of claim 29, wherein the accessing comprises accessing in parallel at least two data blocks, at least one of which is referenced by another data block of the at least two data blocks.

31. The method of claim 29, wherein the accessing comprises utilizing the references to access the plurality of data blocks in a predetermined order.

32. The method of claim 31, further comprising:
preprocessing the list of references to reflect the predetermined order, prior to said accessing and said mounting.

33. The method of claim 32, wherein the predetermined order is selected for the purpose of reducing latency associated with mounting the storage volume.

34. The method of claim 29, further comprising:
caching the plurality of data blocks prior to the accessing and the mounting;
wherein the accessing includes accessing the cached data blocks.

35. The method of claim 29, further comprising:
creating the list of references to the data blocks prior to the accessing and the mounting.

36. The method of claim 35, wherein the creating is done by recording block requests associated with an initial mounting of the storage volume.

37. The method of claim 29, further comprising:
updating the list of references in response to a change to a file system associated with the storage volume.

38. The method of claim 29, further comprising:
updating the list of references in response to one or more of the blocks being moved from a first location to a second location.

39. The method of claim 29, further comprising:
updating the list of references based on a feature associated with one or more of the blocks referenced by the block references, and wherein the feature is selected from the group consisting of a snapshot, a mirror, and a clone.

40. A method comprising:
in a network storage server,
storing a storage volume in a main storage subsystem of the network storage server;
generating a list of references to a plurality of data blocks that are required for mounting the storage volume, the plurality of data blocks containing file system metadata related to the storage volume, the list indicating an order in which to access the plurality of data blocks;
storing the list in a non-volatile solid-state memory separate from the main storage subsystem; and
accessing the plurality of data blocks that are required for mounting the storage volume by using the list of references, in parallel with mounting the storage volume, wherein the accessing involves utilizing the references in the list to access the plurality of data blocks in the order indicated by the list, and wherein the accessing involves accessing in parallel at least two data blocks, at least one of which is referenced by another data block of the at least two data blocks.

41. The method of claim 40, wherein generating the list of references comprises recording block requests associated with an initial mounting of the storage volume.

* * * * *